(12) United States Patent
Xin (10) Patent No.: US 11,281,083 B1
(45) Date of Patent: Mar. 22, 2022

(54) PROJECTION DEVICE

(71) Applicant: Yuanting Xin, Shenzhen (CN)

(72) Inventor: Yuanting Xin, Shenzhen (CN)

( * ) Notice: Subject to any disclaimer, the term of this patent is extended or adjusted under 35 U.S.C. 154(b) by 0 days.

(21) Appl. No.: 17/465,864

(22) Filed: Sep. 3, 2021

(30) Foreign Application Priority Data

Aug. 16, 2021 (CN) .......................... 202121913683.1

(51) Int. Cl.
*G03B 21/20* (2006.01)
*G03B 21/14* (2006.01)

(52) U.S. Cl.
CPC ....... *G03B 21/2006* (2013.01); *G03B 21/145* (2013.01); *G03B 21/208* (2013.01)

(58) Field of Classification Search
CPC .... G03B 21/20; G03B 21/145; G03B 21/206; G03B 21/208; G03B 21/2006; G03B 21/2013; G03B 21/2033; G03B 21/2053; H04N 9/3141; H04N 9/3161; H04N 9/3173
See application file for complete search history.

(56) References Cited

U.S. PATENT DOCUMENTS

| | | | |
|---|---|---|---|
| 9,900,566 B2 | 2/2018 | Guo | |
| 10,440,308 B2* | 10/2019 | Xi | F21S 10/007 |
| 10,863,095 B2 | 4/2020 | Fujita | |
| 11,032,526 B2 | 6/2021 | Tsao et al. | |
| 11,099,469 B1* | 8/2021 | Selfe | G02B 3/08 |
| 2015/0015700 A1* | 1/2015 | Becker | G01S 17/66 |
| | | | 348/136 |
| 2016/0127701 A1* | 5/2016 | Chern | G02B 13/001 |
| | | | 353/7 |
| 2016/0313636 A1* | 10/2016 | Chien | F21S 9/022 |
| 2021/0328412 A1* | 10/2021 | Hettier | H01S 5/02257 |

* cited by examiner

*Primary Examiner* — Sultan Chowdhury
(74) *Attorney, Agent, or Firm* — Benjamin H.B. Sley (57) ABSTRACT

A projection device includes a first light-emitting component, a second light-emitting component and a housing. The first light-emitting component and the second light-emitting component are fixed to the housing. A first outer surface of the housing is provided with a first light outlet and a second light outlet; the first light-emitting component is arranged corresponding to the first light outlet; the second light-emitting component is arranged corresponding to the second light outlet; and the first light outlet has a larger area than the second light outlet, such that a projection range of the second light-emitting component is within that of the first light-emitting component. The disclosure can avoid the defect of a single effect of a lamp cap of a projection lamp in the scope of the prior art.

9 Claims, 10 Drawing Sheets

FIG. 10

PROJECTION DEVICE

CROSS-REFERENCE TO RELATED APPLICATIONS

This application claims priority to Chinese Patent Application No. 202121913683.1 with a filing date of Aug. 16, 2021. The content of the aforementioned application, including any intervening amendments thereto, is incorporated herein by reference.

TECHNICAL FIELD

The disclosure relates to the field of illumination, in particular to a projection device.

BACKGROUND

A projection lamp, also known as an ambient lamp, is used in indoor places such as bedrooms and living rooms. The projection lamp is used to create an ambience, such as a starry sky and water ripples. However, the existing projection lamps basically generate only starry sky or water ripples during projection, easily making users feel visual fatigue.

SUMMARY

The technical problem to be solved by the disclosure is to provide a projection device to overcome the above shortcomings of the prior art, so as to improve the defect of a single effect of a lamp cap of a projection lamp in the scope of the prior art.

To achieve the above purpose, the disclosure provides a projection device, which includes a first light-emitting component, a second light-emitting component and a housing, where the first light-emitting component and the second light-emitting component are fixed to the housing;

a first outer surface of the housing is provided with a first light outlet and a second light outlet; the first light-emitting component is arranged corresponding to the first light outlet; the second light-emitting component is arranged corresponding to the second light outlet; and the first light outlet has a larger area than the second light outlet, such that a projection range of the second light-emitting component is within that of the first light-emitting component.

The first light-emitting component includes a first light source, a diffusion beam splitter and a hemispherical lens; the hemispherical lens covers the first light outlet and extends outside the housing; the first light source is located inside the housing; and the first light source and the hemispherical lens are located at two opposite sides of the diffusion beam splitter.

A plurality of protrusion structures are arranged on a surface, facing the hemispherical lens, of the diffusion beam splitter; and the protrusion structures have heights ranging from 0.5 mm to 2.5 mm and are each of a water drop structure in an irregular shape.

The first light-emitting component further includes a driver, and the driver is fixedly connected with the diffusion beam splitter and used for driving the diffusion beam splitter to rotate in a circumferential direction of the first light outlet.

The first light source is at least one lamp bead, and an inner wall of the hemispherical lens is provided with a plurality of connected polygonal structures.

The first light-emitting component further includes a first collecting lens located between the first light source and the diffusion beam splitter, and the inner wall of the hemispherical lens is provided with a plurality of irregular arc-shaped prism structures.

The second light-emitting component includes a second collecting lens, an image negative film, a third collecting lens and a second light source; the second collecting lens, the image negative film, the third collecting lens and the second light source are sequentially arranged in a direction away from the second light outlet; the second collecting lens is arranged in the second light outlet; and the image negative film, the third collecting lens and the second light source are fixedly arranged inside the housing.

The second light-emitting component further includes a light source fixing plate and a hollow fixing member; the light source fixing plate is fixedly connected with the fixing member; the second collecting lens, the image negative film and the third collecting lens are all embedded into the fixing member; and the second light source is arranged on the light source fixing plate; and the fixing member is sequentially provided with a first clamping groove, an accommodating cavity and a second clamping groove; the first clamping groove is used for placing the second collecting lens; the accommodating cavity is used for placing the image negative film; and the second clamping groove is used for placing the third collecting lens.

The image negative film is provided with at least one pattern; the second light-emitting component further includes a toggle member used for driving the image negative film to rotate; the image negative film is fixed to the toggle member; the toggle member is arranged inside the accommodating cavity; and the accommodating cavity is provided with an opening for exposing at least a part of the toggle member.

The projection device further includes a third light-emitting component which is fixedly arranged inside the housing; the first outer surface of the housing is further provided with a third light outlet corresponding to the third light-emitting component; and the third light-emitting component includes a third light source and a light microscope.

By arranging the second light-emitting component and making the projection range of the second light-emitting component be within the projection range of the first light-emitting component, the disclosure has the beneficial effects of realizing overlapping of the two projection ranges, preventing a single projection environment, and improving the richness of projection contents.

BRIEF DESCRIPTION OF THE DRAWINGS

The disclosure is further described below in detail with reference to the accompanying drawings and embodiments. In the figures.

DETAILED DESCRIPTION OF THE EMBODIMENTS

In order to understand the technical features, purposes and effects of the disclosure more clearly, specific implementations of the disclosure are described in detail below with reference to the accompanying drawings.

Figure 1:
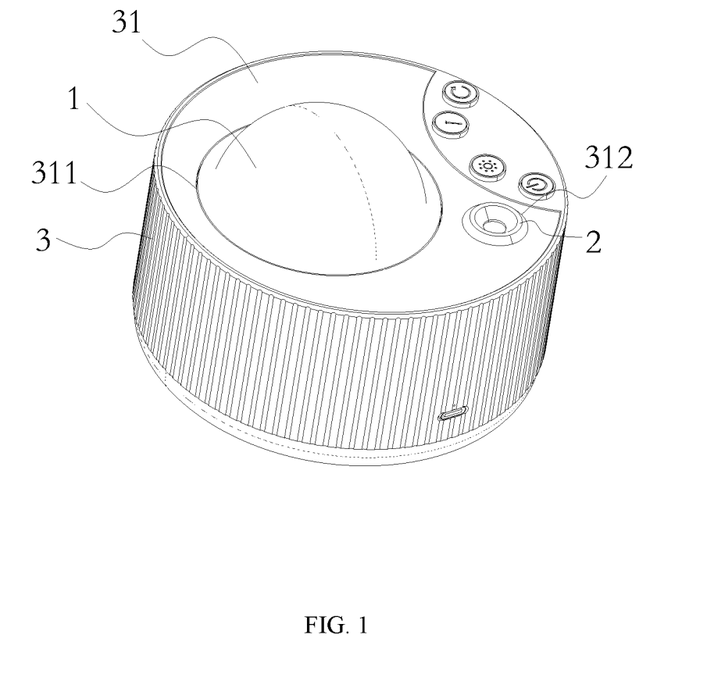
FIG. 1 is a structural schematic diagram of a first embodiment of the projection device provided by the disclosure.

FIG. 1 is the structural schematic diagram of the first embodiment of the projection device provided by the disclosure.

The projection device includes a first light-emitting component 1, a second light-emitting component 2 and a housing 3, and the first light-emitting component and the second light-emitting component are fixed to the housing.

A first outer surface 31 of the housing is provided with a first light outlet 311 and a second light outlet 312; the first light-emitting component is arranged corresponding to the first light outlet 311; the second light-emitting component 2 is arranged corresponding to the second light outlet; and the first light outlet 311 has a larger area than the second light outlet 312, such that a projection range of the second light-emitting component 2 is within that of the first light-emitting component 1. Specifically, the first light-emitting component 1 can be used for generating a projection effect of aurora or water ripples; the second light-emitting component 2 can be used for generating a projection of a celestial body; and by projecting the celestial body on the aurora or water ripples, a more realistic ambient can be generated, such as a moon in water and a moon in aurora. The second light-emitting component 2 can also be used for generating projections of people, animals, plants, vehicles, etc. The first light-emitting component 1 can also be used for generating corresponding ambient projections such as swimming fishes and changing clouds.

The first light-emitting component 1 can be used for generating a dynamic projection effect; the second light-emitting component 2 can be used for generating a static projection image; and by combination of dynamic and static projections, richness and fidelity of projection contents can be improved.

By arranging the second light-emitting component 2 and making the projection range of the second light-emitting component 2 be within the projection range of the first light-emitting component 1, this embodiment of the disclosure has the beneficial effects of realizing overlapping of the two projection ranges, preventing a single projection environment and improving the richness of the projection contents.

Figure 2:
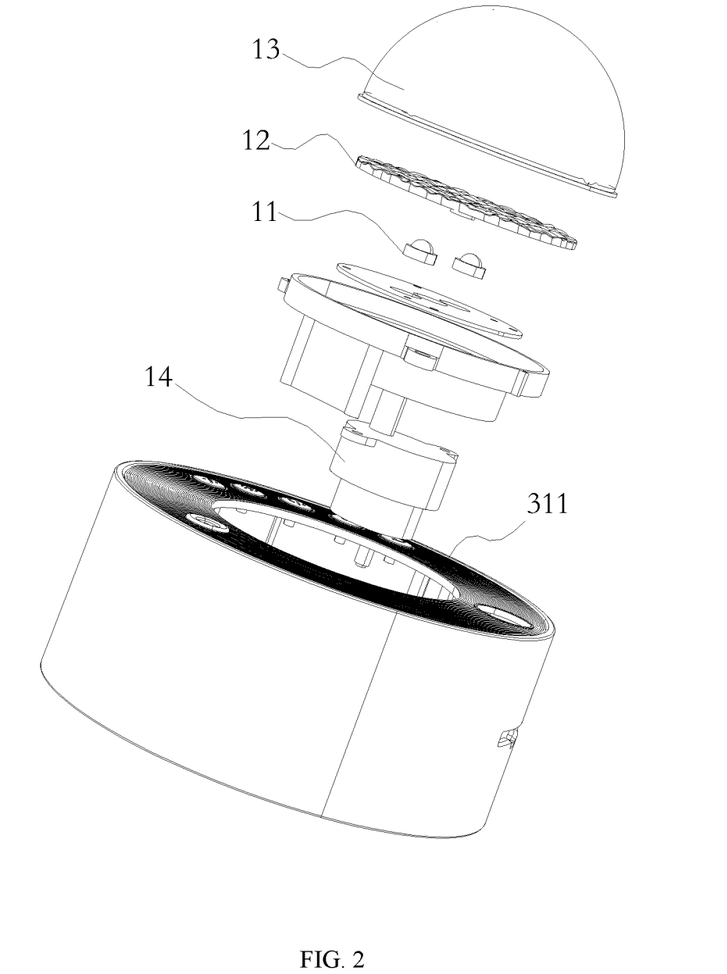
FIG. 2 is an exploded view of the first embodiment of the first light-emitting component provided by the disclosure.

FIG. 2 is the exploded view of the first embodiment of the first light-emitting component provided by the disclosure.

The first light-emitting component 1 includes a first light source 11, a diffusion beam splitter 12 and a hemispherical lens 13. The hemispherical lens 13 covers the first light outlet 311 and extends outside the housing; the first light source 11 is located inside the housing; and the first light source 11 and the hemispherical lens 13 are located at two opposite sides of the diffusion beam splitter 12.

A plurality of protrusion structures are arranged on a surface, facing the hemispherical lens 13, of the diffusion beam splitter 12; and the protrusion structures have heights ranging from 0.5 mm to 2.5 mm and are each of a water drop structure in an irregular shape. The diffusion beam splitter 12 includes a first surface and a second surface; the first surface is provided with a plurality of protrusion structures and faces the hemispherical lens 13; and the second surface faces the first light source 11 and is of a smooth and flat structure. A height of the protrusion structures refers to a height of the protrusion structures relative to the first surface. It should be noted that when the protrusion structures have heights ranging from 0.5 mm to 2.5 mm, scattered light generated by the diffusion beam splitter 12 has a more coherent fluctuation effect.

The first light-emitting component further includes a driver 14, and the driver 14 is fixedly connected with the diffusion beam splitter 12 and used for driving the diffusion beam splitter 12 to rotate in a circumferential direction of the first light outlet 311. Specifically, the driver 14 may be a motor. The driver 14 can be used for driving the diffusion beam splitter 12 to generate scattered light with more fluctuation, thereby improving a dynamic effect.

An outer surface, away from the diffusion beam splitter 12, of the hemispherical lens 13 is a smooth surface with no textures; an inner surface, facing the diffusion beam splitter 12, of the hemispherical lens 13 can be provided with different optical structures for producing different visual effects; and for example, the optical structures may be polygonal lens structures capable of generating a water ripple effect or arc-shaped prism structures capable of generating an aurora effect. In addition, the hemispherical lens 13 can also widen the projection range of the first light-emitting component.

Figure 3:
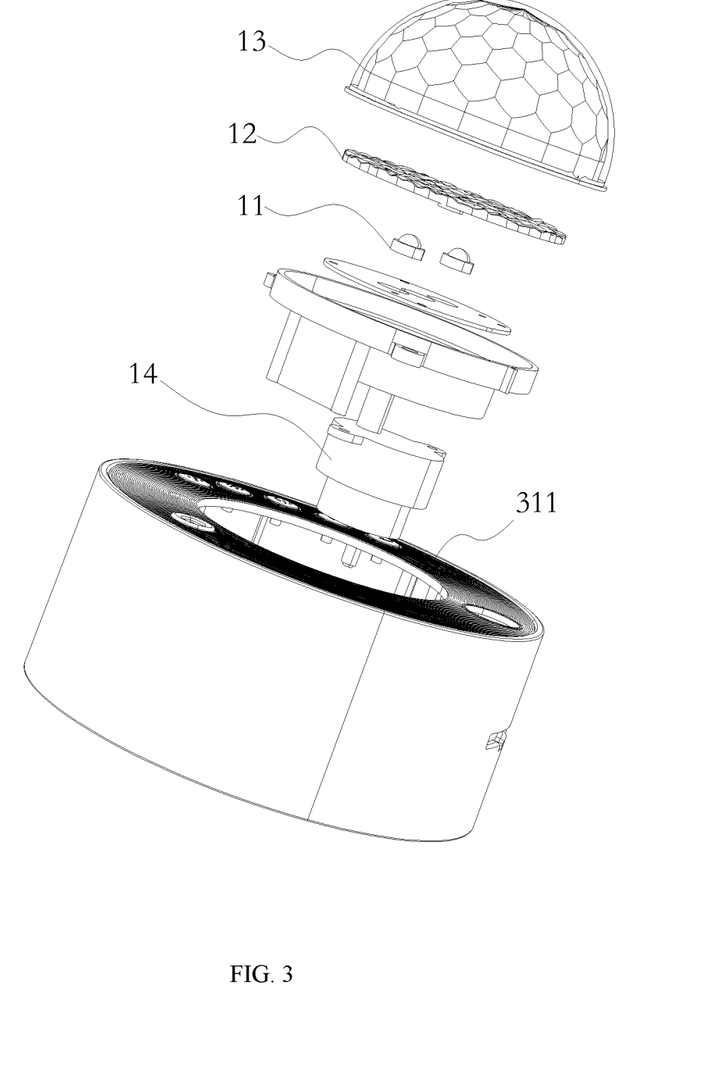
FIG. 3 is an exploded view of a second embodiment of the first light-emitting component provided by the disclosure.

FIG. 3 is an exploded view of a second embodiment of the first light-emitting component provided by the disclosure.

The first light-emitting component 1 includes a first light source 11, a diffusion beam splitter 12 and a hemispherical lens 13. The hemispherical lens 13 covers the first light outlet 311 and extends outside the housing; the first light source 11 is located inside the housing; and the first light source 11 and the hemispherical lens 13 are located at two opposite sides of the diffusion beam splitter 12.

The first light source 11 includes at least one lamp bead, which may be a plurality of colored lamp beads, and specifically, the colored lamp beads may be LED lamps supporting Red, Green, Blue, White (RGBW).

A plurality of protrusion structures are arranged on a surface, facing the hemispherical lens 13, of the diffusion beam splitter 12; and the protrusion structures have heights ranging from 0.5 mm to 2.5 mm and are each of a water drop structure in an irregular shape. The diffusion beam splitter 12 includes a first surface and a second surface; the first surface is provided with a plurality of protrusion structures and faces the hemispherical lens 13; and the second surface faces the first light source 11 and is of a smooth and flat structure. A height of the protrusion structures refers to a height of the protrusion structures relative to the first surface. It should be noted that when the protrusion structures have heights ranging from 0.5 mm to 2.5 mm, scattered light generated by the diffusion beam splitter 12 has a more coherent fluctuation effect.

The first light-emitting component further includes a driver 14, and the driver 14 is fixedly connected with the diffusion beam splitter 12 and used for driving the diffusion beam splitter 12 to rotate in a circumferential direction of the first light outlet 311. Specifically, the driver 14 may be a motor. The driver 14 can be used for driving the diffusion beam splitter 12 to generate scattered light with more fluctuation, thereby improving a dynamic effect.

Figure 4:
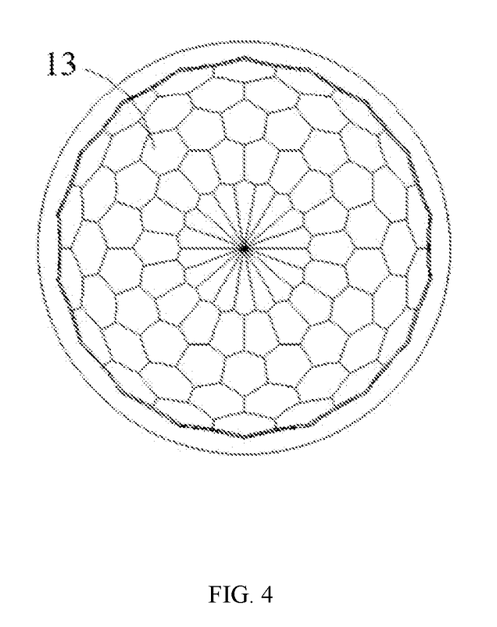
FIG. 4 is a structural schematic diagram of a first embodiment of the hemispherical lens provided by the disclosure.

An outer surface, away from the diffusion beam splitter 12, of the hemispherical lens 13 is a smooth surface with no textures, and an inner surface of the hemispherical lens 13 is provided with a plurality of connected polygonal structures. Specifically, as shown in FIG. 4, an inner wall of the hemispherical lens 13 is provided with a plurality of inner quadrilaterals and outer hexagons; the plurality of inner quadrilaterals are circumferentially arranged around a vertex of the hemispherical lens 13; and the outer hexagons are connected with the corresponding inner quadrilaterals and are also circumferentially arranged around the vertex of the hemispherical lens 13.

The first light-emitting component 1 of this embodiment of the disclosure can generate a water ripple effect. In addition, the second light-emitting component 2 can be used for generating a projection of a celestial body such as a moon; and a visual effect of a moon in water can be generated by superimposing of effects of the first light-emitting component 1 and the second light-emitting component 2. An embodiment of the second light-emitting component 2 will be described in detail below.

Figure 5:
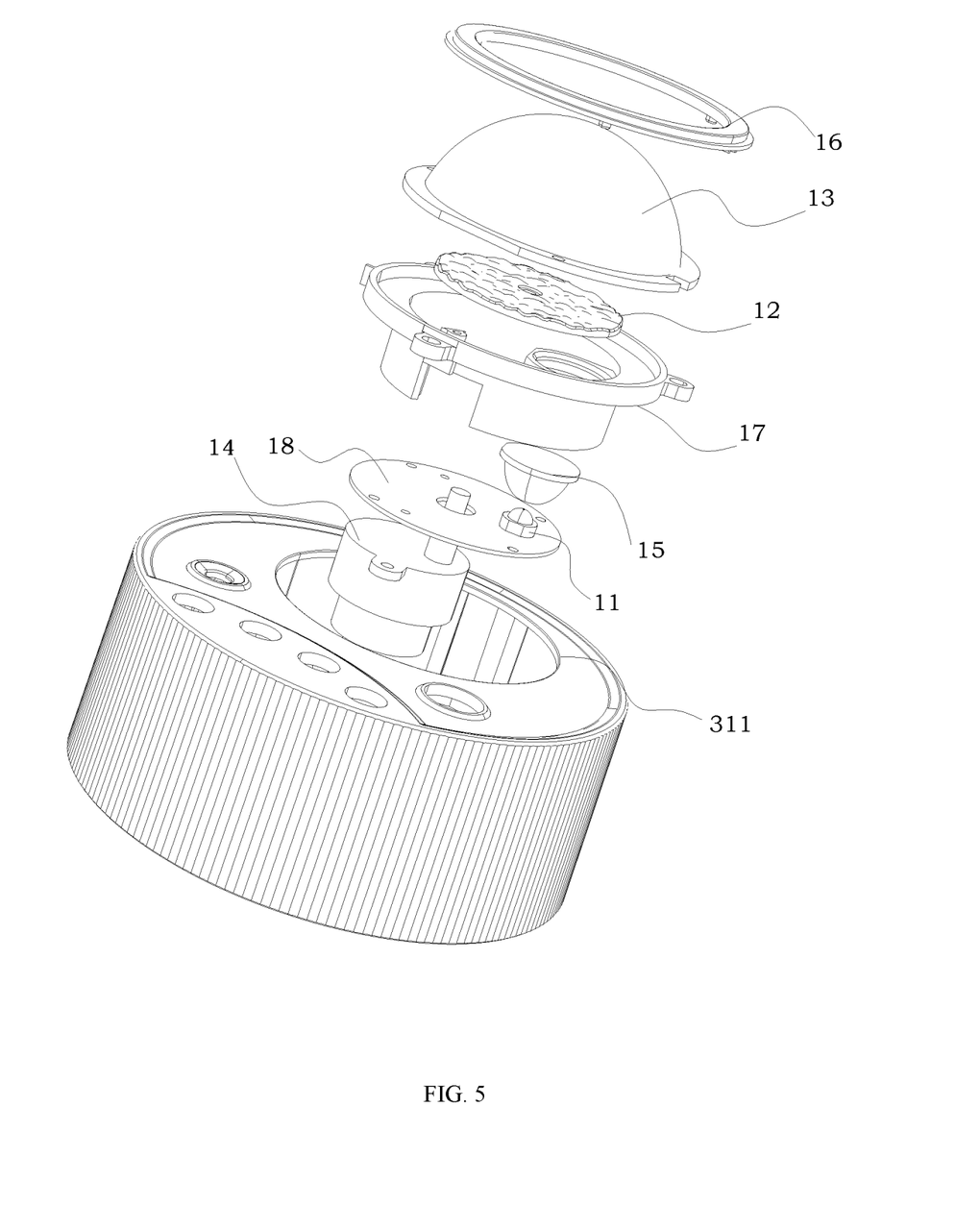
FIG. 5 is an exploded view of a third embodiment of the first light-emitting component provided by the disclosure.

FIG. 5 is an exploded view of a third embodiment of the first light-emitting component provided by the disclosure.

The first light-emitting component 1 includes a first light source 11, a first collecting lens 15, a diffusion beam splitter 12 and a hemispherical lens 13. The hemispherical lens 13 covers the first light outlet 311 and extends outside the housing; the first light source 11 is located inside the housing; and the first light source 11 and the hemispherical lens 13 are located at two opposite sides of the diffusion beam splitter 12. The first collecting lens 15 is located between the first light source 11 and the diffusion beam splitter 12. The first collecting lens 15 is used for collecting light of the first light source 11 on the diffusion beam splitter 12.

A plurality of protrusion structures are arranged on a surface, facing the hemispherical lens 13, of the diffusion beam splitter 12; and the protrusion structures have heights ranging from 0.5 mm to 2.5 mm and are each of a water drop structure in an irregular shape. The diffusion beam splitter 12 includes a first surface and a second surface; the first surface is provided with a plurality of protrusion structures and faces the hemispherical lens 13; and the second surface faces the first light source 11 and is of a smooth and flat structure. A height of the protrusion structures refers to a height of the protrusion structures relative to the first surface. It should be noted that when the protrusion structures have heights ranging from 0.5 mm to 2.5 mm, scattered light generated by the diffusion beam splitter 12 has a more coherent fluctuation effect.

The first light-emitting component further includes a driver 14, and the driver 14 is fixedly connected with the diffusion beam splitter 12 and used for driving the diffusion beam splitter 12 to rotate in a circumferential direction of the first light outlet 311. Specifically, the driver 14 may be a motor. The driver 14 can be used for driving the diffusion beam splitter 12 to generate scattered light with more fluctuation, thereby improving a dynamic effect of projection.

Preferably, the first light-emitting component further includes a first annular fixing frame 16, a second annular fixing frame 17 and a third fixing plate 18. The first annular fixing frame 16 sleeves the hemispherical lens 13 and is arranged between the hemispherical lens 13 and the first light outlet 311. The first light source 11 is fixed to the third fixing plate 18; the second annular fixing frame 17 is provided with a first limiting groove for fixing the first collecting lens 15; and the first limiting groove corresponds to the first light source 11 in position, such that the first collecting lens 15 is located over the first light source 11. The second annular fixing frame 17 is further provided with a second limiting groove for supporting the hemispherical lens 13, and the hemispherical lens 13 is placed inside the second limiting groove. The second limiting groove has a larger area than the first limiting groove. The second annular fixing frame 17 is of a hollow structure; a hollow part is used for placing the diffusion beam splitter 12, and the hollow part has a larger area than the diffusion beam splitter 12, so as to avoid interference with rotation of the diffusion beam splitter 12. The second annular fixing frame 17 is fixedly connected with the third fixing plate 18, and specifically, the second annular fixing frame 17 is fixedly connected with the third fixing plate 18 through screws.

The driver 14 is located under the third fixing plate 18; a center position of the third fixing plate 18 is provided with a through hole for a driving shaft of the driver 14 to pass through; and the driving shaft is fixedly connected with the diffusion beam splitter 12 after passing through the through hole. The through hole has a hole diameter larger than a diameter of the driving shaft so as to avoid interference with rotation of the driving shaft.

Figure 6:
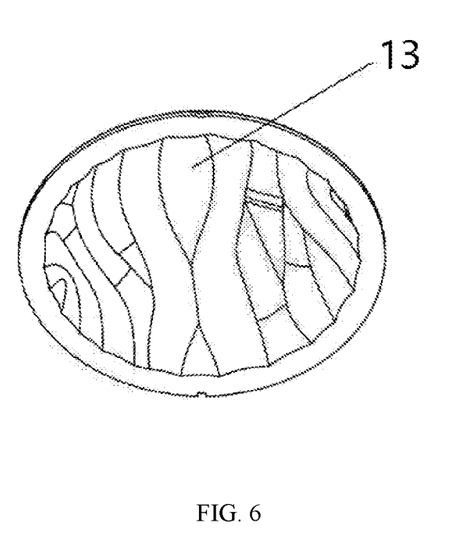
FIG. 6 is a structural schematic diagram of a second embodiment of the hemispherical lens provided by the disclosure.

As shown in FIG. 6, an outer surface, away from the diffusion beam splitter 12, of the hemispherical lens 13 is a smooth surface with no textures, and an inner surface of the hemispherical lens 13 is provided with a plurality of irregular arc-shaped prism structures.

The first light-emitting component 1 of this embodiment of the disclosure can generate an aurora effect. In addition, the second light-emitting component 2 can be used for generating a projection of a celestial body such as a moon; and a visual effect of cooperation of an aurora and a moon can be generated by superimposing of effects of the first light-emitting component 1 and the second light-emitting component 2. An embodiment of the second light-emitting component 2 will be described in detail below.

Figure 7:
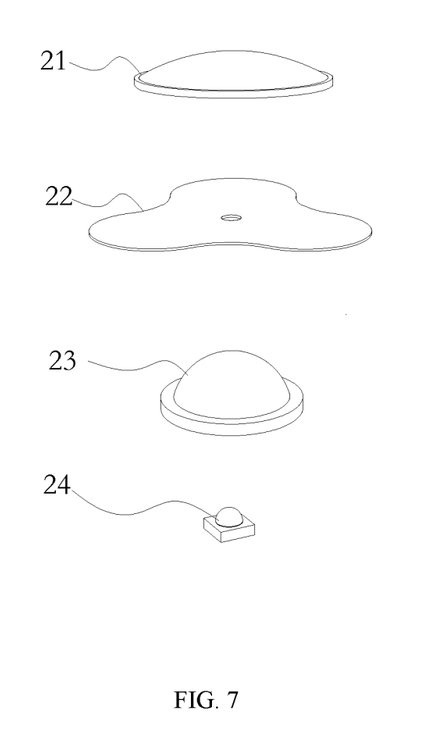
FIG. 7 is an exploded view of a first embodiment of the second light-emitting component provided by the disclosure.

FIG. 7 is an exploded view of a first embodiment of the second light-emitting component provided by the disclosure.

The second light-emitting component 2 includes a second collecting lens 21, an image negative film 22, a third collecting lens 23 and a second light source 24. The second collecting lens 21, the image negative film 22, the third collecting lens 23 and the second light source 24 are sequentially arranged in a direction away from the second light outlet; the second collecting lens 21 is arranged at the second light outlet 312; and the image negative film 22, the third collecting lens 23 and the second light source 24 are fixedly arranged inside the housing 3. Specifically, the image negative film 22 may be a film. Specifically, the first light source 24 may be a high-brightness LED lamp. The image negative film 22 may be provided with images of one or more people, animals, plants, vehicles, etc.

The images on the image negative film can be projected more clearly through light collection of the second collecting lens and the third collecting lens, and therefore image resolution is improved.

Figure 8:
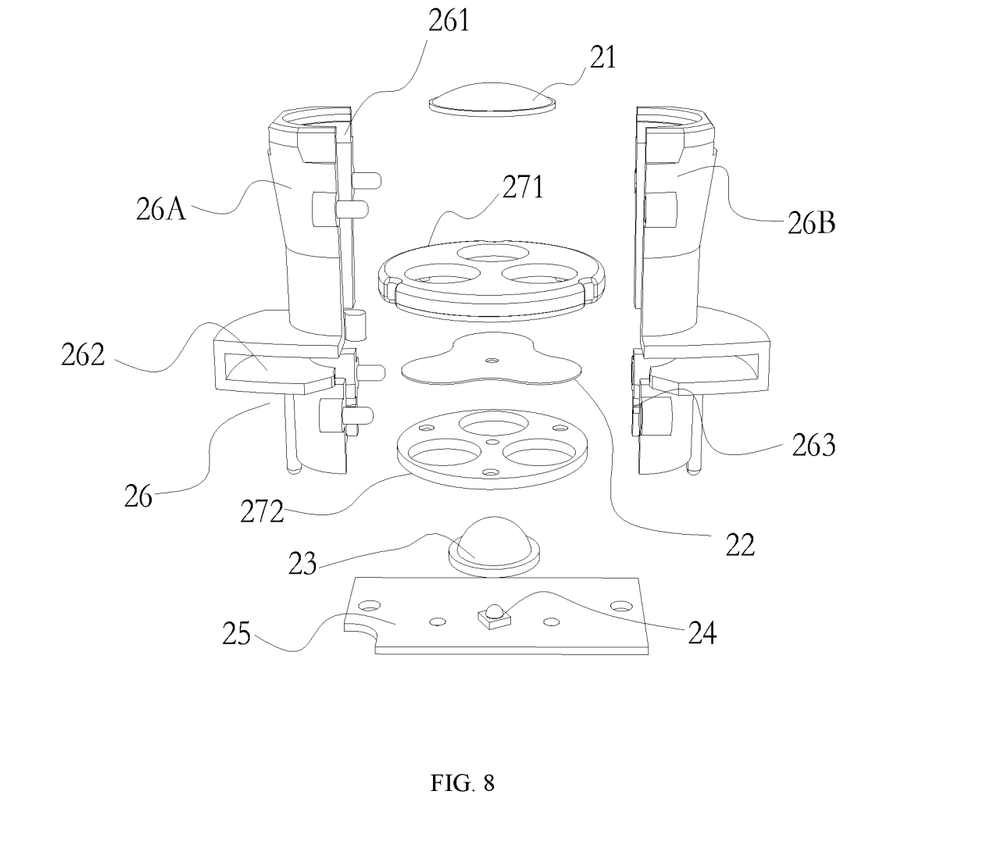
FIG. 8 is an exploded view of a second embodiment of the second light-emitting component provided by the disclosure.

FIG. 8 is an exploded view of a second embodiment of the second light-emitting component provided by the disclosure.

The second light-emitting component includes a second collecting lens 21, an image negative film 22, a third collecting lens 23, a second light source 24, a light source fixing plate 25 and a hollow fixing member 26.

The second collecting lens 21, the image negative film 22, the third collecting lens 23 and the second light source 24 are sequentially arranged in a direction away from the second light outlet; the second collecting lens 21 is arranged at the second light outlet 312; and the image negative film 22, the third collecting lens 23 and the second light source 24 are fixedly arranged inside the housing 3. Specifically, the image negative film 22 may be a film. Specifically, the first light source 24 may be a high-brightness LED lamp. The image negative film 22 may be provided with patterns of one or more people, animals, plants, vehicles, etc.

The light source fixing plate 25 is fixedly connected with the fixing member 26; the second collecting lens 21, the image negative film 22 and the third collecting lens 23 are all embedded into the fixing member 26; and the second light source 24 is arranged on the light source fixing plate 25.

The fixing member 26 is sequentially provided with a first clamping groove 261, an accommodating cavity 262 and a second clamping groove 263; the first clamping groove 261 is used for placing the second collecting lens 21; the accommodating cavity 262 is used for placing the image negative film; and the second clamping groove 263 is used for placing the third collecting lens 23.

Specifically, the light source fixing plate 25 is provided with a mounting hole 252; the fixing member 26 is provided with a fixing column 264; and the fixing member is inserted into the mounting hole 264 and has an interference fit with the mounting hole 252, such that the light source fixing plate 25 is fixedly connected with the fixing member 26. The light source fixing plate 25 is fixedly connected with the housing 3.

By arranging the fixing member 26, the second collecting lens 21, the image negative film 22 and the third collecting lens 23 can be fixed better, thereby reducing occurrence about a poor projection effect caused by loosening of each component in the second light-emitting component 2 after the projection device is collided, and accordingly improving reliability of the fixing member 26. It should be noted that the fixing member 26 can be formed by splicing a first member 26A and a second member 26B which are approximately symmetric in structure, so as to facilitate installation of the second collecting lens 21, the image negative film 22 and the third collecting lens 23.

Figure 10:
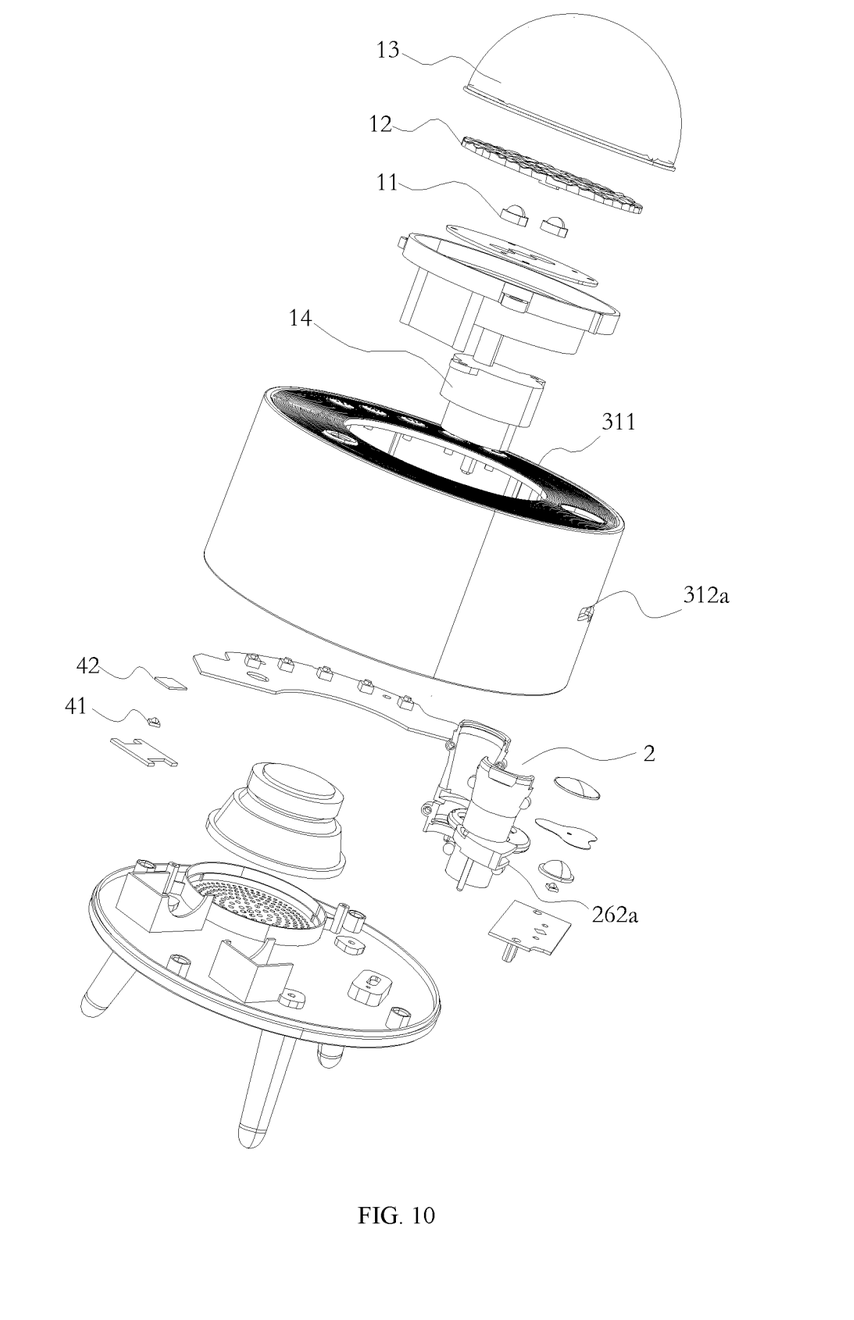
FIG. 10 is an exploded view of the second embodiment of the projection device provided by the disclosure.

In addition, the image negative film 22 may be further provided with a plurality of celestial body images. Correspondingly, the second light-emitting component 2 further includes a toggle member for driving the image negative film 22 to rotate; the image negative film 22 is fixed to the toggle member; and the toggle member is arranged inside the accommodating cavity 262. As shown in FIG. 10, the accommodating cavity 262 is provided with a first opening 262a for exposing at least a part of the toggle member. It should be noted that the housing 3 should also be provided with a second opening 312a corresponding to the first opening 262a, such that a user can conveniently pull the toggle member to change projection images.

Preferably, the toggle member includes a first pulling plate 271 and a second pulling plate 272; the image negative film 22 is sandwiched between the first pulling plate 271 and the second pulling plate 272; the first pulling plate 271 and the second pulling plate 272 are each provided with a through hole for exposing the images on the image negative film 22; and the number of the through holes is consistent with that of the images on the image negative film 22.

Specifically, the housing 3 includes a top housing 31 and a bottom housing 32, and the top housing 31 includes a first outer surface 311 and a side surface 312 surrounding the first outer surface 311. The side surface is provided with a second opening 312a. A plurality of supporting parts are arranged on the bottom housing 32.

Figure 9:
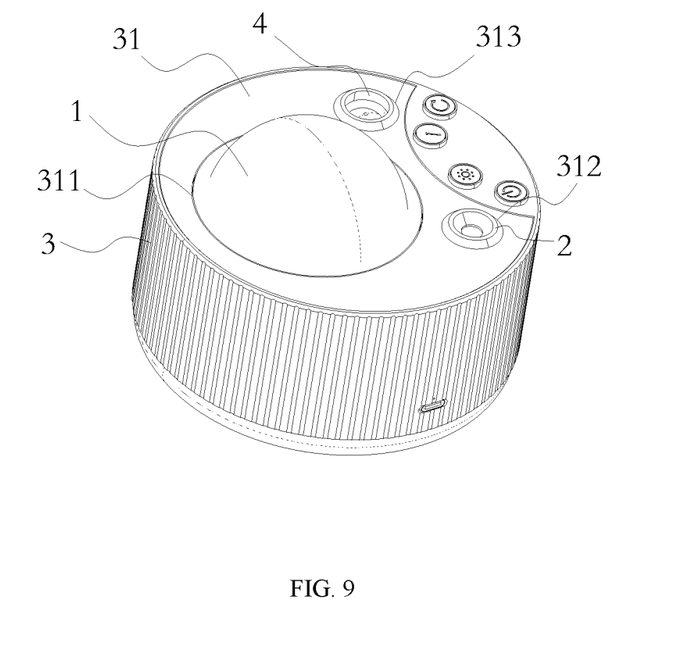
FIG. 9 is a three-dimensional structural schematic diagram of a second embodiment of the projection device provided by the disclosure.

FIG. 9 and FIG. 10 are structural schematic diagrams of a second embodiment of the projection device provided by the disclosure.

The projection device includes a first light-emitting component 1, a second light-emitting component 2, a third light-emitting component 4 and a housing 3, where the first light-emitting component 1, the second light-emitting component 2 and the third light-emitting component 4 are all fixed to the housing 3.

A first outer surface 31 of the housing is provided with a first light outlet 311, a second light outlet 312 and a third light outlet 313; the first light-emitting component 1 is arranged corresponding to the first light outlet 311; the second light-emitting component 2 is arranged corresponding to the second light outlet 312; and the third light-emitting component 4 is arranged corresponding to the third light outlet 313. The first light outlet 311 has a larger area than the second light outlet 312, such that a projection range of the second light-emitting component 2 is within that of the first light-emitting component 1. Specific structures of the first light-emitting component 1 and the second light-emitting component 2 are described above in detail, which are not repeated here again.

The third light-emitting component 4 includes a third light source 41 and a microscope 42. The third light source 41 may be a breathing lamp or a high-brightness LED lamp, and the light microscope 42 may be a light scattering lens. By arranging the third light-emitting component 4, the projection device can have more functions; for example, by arranging a high-brightness LED lamp, the projection device can become a small night light; and by arranging a breathing lamp and controlling changes of light brightness, more lighting ambiences can be provided.

Specifically, the projection device further includes a main control circuit board, a power supply circuit board and a cooler. The pow supply circuit board is connected with the main control circuit board and the second light source respectively; and the main control circuit board is connected with the cooler and the driver. The power supply circuit board has a voltage conversion function, which can convert 220V alternating-current power of an external power supply into 5V/2A direct-current power so as to supply power for the main control circuit board and the second light source. The main control circuit board is provided with an AC6925B single chip, and functions of the projection device are set through a burning presetting program. The main control circuit board is used for controlling a working state of the cooler, controlling on/off and a brightness of each of the LED lamps in the first light source 11, and controlling a rotating direction and a rotating velocity of the driver.

The embodiments of the disclosure have been described above with reference to the accompanying drawings, but the disclosure is not limited to the above specific embodiments. The above specific embodiments are merely illustrative rather than restrictive. Under the inspiration of the disclosure, those of ordinary skill in the art can make a variety of improvements without departing from the purpose of the disclosure and the protection scope defined by the claims, and all these improvements shall fall within the protection scope of the disclosure.

What is claimed is:

1. A projection device, comprising a first light-emitting component, a second light-emitting component and a housing, wherein the first light-emitting component and the second light-emitting component are fixed to the housing;
   a first outer surface of the housing is provided with a first light outlet and a second light outlet; the first light-emitting component is arranged corresponding to the first light outlet; the second light-emitting component is arranged corresponding to the second light outlet; and the first light outlet has a larger area than the second light outlet;
   the first light-emitting component comprises a first light source, a diffusion beam splitter and a hemispherical lens; the hemispherical lens covers the first light outlet and extends outside the housing; the first light source is located inside the housing; and the first light source and the hemispherical lens are located at two opposite sides of the diffusion beam splitter.

2. The projection device according to claim 1, wherein a plurality of protrusion structures are arranged on a surface, facing the hemispherical lens, of the diffusion beam splitter; and the protrusion structures have heights ranging from 0.5 mm to 2.5 mm and are each of a water drop structure in an irregular shape.

3. The projection device according to claim 1, wherein the first light-emitting component further comprises a driver, and the driver is fixedly connected with the diffusion beam splitter and used for driving the diffusion beam splitter to rotate in a circumferential direction of the first light outlet.

4. The projection device according to claim 1, wherein the first light source comprises at least one lamp bead, and an inner wall of the hemispherical lens is provided with a plurality of connected polygonal structures.

5. The projection device according to claim 1, wherein the first light-emitting component further comprises a first collecting lens located between the first light source and the diffusion beam splitter, and an inner wall of the hemispherical lens is provided with a plurality of irregular arc-shaped prism structures.

6. A projection device comprising a first light-emitting component, a second light-emitting component and a housing, wherein the first light-emitting component and the second light-emitting component are fixed to the housing;
   a first outer surface of the housing is provided with a first light outlet and a second light outlet the first light-emitting component is arranged corresponding to the first light outlet the second light-emitting component is arranged corresponding to the second light outlet and the first light outlet has a larger area than the second light outlet;
   the second light-emitting component comprises a second collecting lens, an image negative film, a third collecting lens and a second light source; the second collecting lens, the image negative film, the third collecting lens and the second light source are sequentially arranged in a direction away from the second light outlet; the second collecting lens is arranged in the second light outlet; and the image negative film, the third collecting lens and the second light source are fixedly arranged inside the housing.

7. The projection device according to claim 6, wherein the second light-emitting component further comprises a light source fixing plate and a hollow fixing member; the light source fixing plate is fixedly connected with the fixing member; the second collecting lens, the image negative film and the third collecting lens are all embedded into the fixing member; and the second light source is arranged on the light source fixing plate;
   the fixing member is sequentially provided with a first clamping groove, an accommodating cavity and a second clamping groove; the first clamping groove is used for placing the second collecting lens; the accommodating cavity is used for placing the image negative film; and the second clamping groove is used for placing the third collecting lens.

8. The projection device according to claim 7, wherein the image negative film is provided with at least one pattern; the second light-emitting component further comprises a toggle member used for driving the image negative film to rotate; the image negative film is fixed to the toggle member; the toggle member is arranged inside the accommodating cavity; and the accommodating cavity is provided with an opening for exposing at least a part of the toggle member.

9. A projection device comprising a first light-emitting component, a second light-emitting component and a housing, wherein the first light-emitting component and the second light-emitting component are fixed to the housing;
   a first outer surface of the housing is provided with a first light outlet and a second light outlet the first light-emitting component is arranged corresponding to the first light outlet the second light-emitting component is arranged corresponding to the second light outlet and the first light outlet has a larger area than the second light outlet;
   the projection device further comprises a third light-emitting component which is fixedly arranged inside the housing; the first outer surface of the housing is further provided with a third light outlet corresponding to the third light-emitting component; and the third light-emitting component comprises a third light source and a light microscope.

* * * * *